US010142356B2

(12) United States Patent
Ahuja et al.

(10) Patent No.: US 10,142,356 B2
(45) Date of Patent: Nov. 27, 2018

(54) CHANNEL DATA ENCAPSULATION SYSTEM AND METHOD FOR USE WITH CLIENT-SERVER DATA CHANNELS

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

( * ) Notice: Subject to any disclaimer, the term of this patent is extended or adjusted under 35 U.S.C. 154(b) by 293 days.

(21) Appl. No.: 15/224,339

(22) Filed: Jul. 29, 2016

(65) Prior Publication Data
US 2018/0034833 A1     Feb. 1, 2018

(51) Int. Cl.
*G06F 11/00*     (2006.01)
*H04L 29/06*     (2006.01)
(Continued)

(52) U.S. Cl.
CPC .......... *H04L 63/1416* (2013.01); *H04L 45/30* (2013.01); *H04L 63/1408* (2013.01);
(Continued)

(58) Field of Classification Search
None
See application file for complete search history.

(56) References Cited

U.S. PATENT DOCUMENTS 9,246,975 B2 * 1/2016 Austin-Lane .......... H04L 67/02
9,467,476 B1   10/2016 Shieh et al.
(Continued)

FOREIGN PATENT DOCUMENTS

EP     2605453 A1     6/2013

OTHER PUBLICATIONS

Security-as-a-Service for Microservices-Based Cloud Applications, Yuqiong Sun, 2015 IEEE 7th International Conference on Cloud Computing Technology and Science (Year: 2015).*
(Continued)

*Primary Examiner* — Gary S Gracia
(74) *Attorney, Agent, or Firm* — Nicholson De Vos Webster & Elliott, LLP

(57) ABSTRACT

Systems and methods are disclosed that relate to network security to monitor and report threats in network traffic of a datacenter. For example, one embodiment discloses a method of receiving, by a first security microservice, a first channel data encapsulation packet encapsulating a first encapsulation context and a first encapsulated data, performing a security service on the first encapsulated data using the first encapsulation context, transmitting by the first security microservice a second channel data encapsulation packet to a second security microservice, wherein the second channel encapsulation packet comprises a request for security services, receiving by the first security microservice a response from the second security microservice comprising a second security microservice context, a second security microservice timestamp, and a second security microservice load. The first security microservice further generates a timestamp and a load included in a response to the first channel data encapsulation packet.

20 Claims, 7 Drawing Sheets

(51) Int. Cl.
*H04L 12/725* (2013.01)
*H04L 29/08* (2006.01)
*G06F 12/14* (2006.01)
*H04L 12/729* (2013.01)
*H04L 12/721* (2013.01)

(52) U.S. Cl.
CPC .. *H04L 67/1002* (2013.01); *G06F 2221/2151* (2013.01); *H04L 45/123* (2013.01); *H04L 45/124* (2013.01); *H04L 45/125* (2013.01); *H04L 63/0428* (2013.01); *H04L 2212/00* (2013.01)

(56) References Cited

U.S. PATENT DOCUMENTS

| | | | |
|---|---|---|---|
| 9,716,617 | B1 | 7/2017 | Ahuja et al. |
| 2010/0125649 | A1 | 5/2010 | Day et al. |
| 2010/0299437 | A1* | 11/2010 | Moore ................ H04L 67/1008 709/226 |
| 2013/0287022 | A1 | 10/2013 | Banavalikar et al. |
| 2015/0040229 | A1* | 2/2015 | Chan ..................... G06F 21/577 726/25 |
| 2016/0094384 | A1 | 3/2016 | Jain et al. |
| 2016/0112475 | A1 | 4/2016 | Lawson et al. |
| 2016/0124742 | A1* | 5/2016 | Rangasamy ............ H04L 47/70 717/103 |
| 2016/0269482 | A1 | 9/2016 | Jamjoom et al. |
| 2017/0059353 | A1* | 3/2017 | Madine .............. G01C 21/3694 |
| 2017/0177546 | A1* | 6/2017 | Heinz ..................... G06F 17/18 |
| 2017/0230349 | A1 | 8/2017 | Gaur et al. |
| 2017/0289307 | A1 | 10/2017 | Thompson et al. |
| 2017/0359217 | A1 | 12/2017 | Ahuja et al. |
| 2018/0027080 | A1 | 1/2018 | Yang et al. |
| 2018/0165604 | A1* | 6/2018 | Minkin ................ G06N 99/005 |

OTHER PUBLICATIONS

On Dependability Modeling in a Deployed Microservice Architecture, Johan Uhle, Jun. 25, 2014 (Year: 2014).*

Performance Evaluation of Microservices Architectures using Containers, Marcelo Amaral, Jorda Polo, David Carrera,2015 IEEE 14th International Symposium on Network Computing and Applications (Year: 2015).*

International Search Report and Written Opinion for Application No. PCT/US2017/044347, dated Oct. 30, 2017, 10 pages.

Advisory Action from U.S. Appl. No. 15/182,573, dated Mar. 21, 2017, 3 pages.

Final Office Action from U.S. Appl. No. 15/182,573 dated Jan. 9, 2017, 8 pages.

Final Office Action from U.S. Appl. No. 15/194,561, dated Feb. 12, 2018, 5 pages.

International Search Report and Written Opinion for Application No. PCT/US2016/058512, dated Mar. 8, 2017, 11 pages.

Lewis J., et al., "Microservices," Mar. 16, 2014, XP055347623, downloaded from the internet https://web.archive.org/web/20140316080617/http://martinfowler.com/articles/microservices.html on Feb. 20, 2017, 8 pages.

Manu A R., "Docker Container Security via Heuristics-Based Multilateral Security-Conceptual and Pragmatic Study," IEEE, International Conference on Circuit, Power and Computing Technologies (ICCPCT), Downloaded from: http://ieeexplore.ieee.org/document/7530217/?part=1, Mar. 18-19, 2016, 17 pages.

Non-Final Office Action from U.S. Appl. No. 15/182,573 dated Aug. 25, 2016, 9 pages.

Non-Final Office Action from U.S. Appl. No. 15/194,561, dated Sep. 8, 2017, 14 pages.

Non-Final Office Action from U.S. Appl. No. 15/224,374, dated Mar. 12, 2018, 14 pages.

Notice of Allowance from U.S. Appl. No. 15/182,573, dated Jun. 8, 2017, 15 pages.

Toffetti G., et al., "An Architecture for Self-managing Microservices," International Workshop on Automated Incident Management in Cloud (AIMC'15), in conjunction with EuroSys'15, The European Conference on Computer Systems, Apr. 21, 2015, pp. 19-23.

* cited by examiner

CHANNEL DATA ENCAPSULATION SYSTEM AND METHOD FOR USE WITH CLIENT-SERVER DATA CHANNELS

TECHNICAL FIELD

Embodiments described herein generally relate to network security. In particular, embodiments described generally relate to channel data encapsulation systems and methods for use with client-server data channels.

BACKGROUND INFORMATION

The expansion of cloud computing services has led to collections of servers to provide computing capacity to run various client applications. Some client-server connections use private networks. Other client-server connections use virtual private networks to exchange data over a public network as if they were directly connected by private networks. With the expansion of cloud computing services has come an expansion of datacenters to host servers. Some hosted servers are housed in multi-tenant datacenters, and share resources with other, potentially unrelated servers.

Data security and monitoring network traffic is a requirement in such datacenters. Data traveling between servers and client applications needs to be monitored for security. One problem to be addressed in monitoring data flow in such a datacenter, including in a multi-tenant scenario, is how to route data to the correct server in the multi-tenant security system. Conflicts can arise among multiple servers having the same IP and MAC addresses. Another problem to be addressed in such a datacenter is how to route packets through the correct security microservices in a hierarchy of security microservices.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
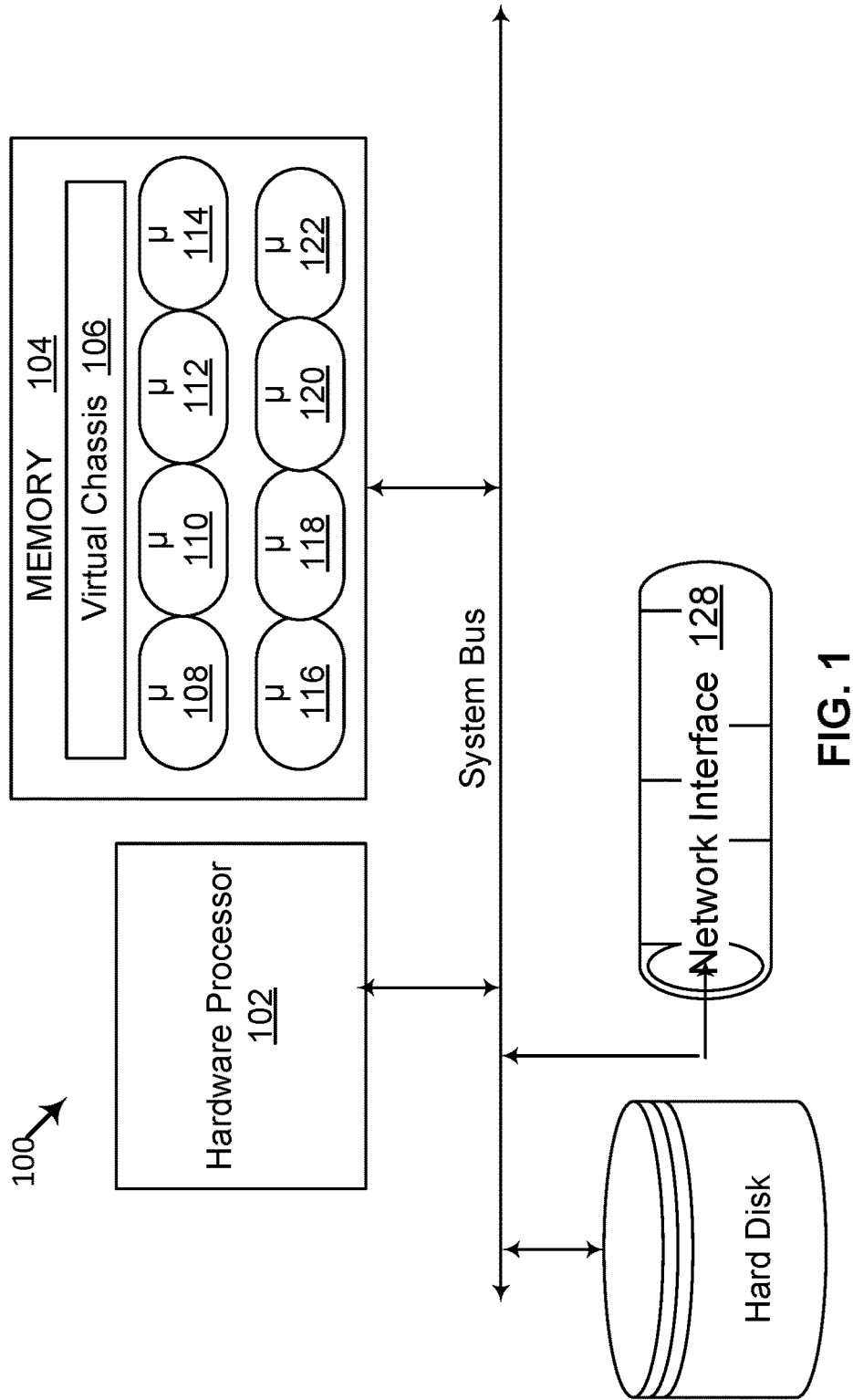
FIG. 1 is a block diagram illustrating computer hardware for loading network security system microservices from a memory and executing them by a processor.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The expansion of cloud computing and datacenters hosting multiple servers present a number of challenges that are addressed by embodiments disclosed herein. For example, when applications and servers communicate over a public network, their Internet Protocol (IP) addresses can conflict with other devices having the same IP addresses. Also, encapsulating every packet with a transmission control protocol/IP (TCP/IP) header is not as efficient as embodiments disclosed herein, which encapsulate data channels, rather than packets. Furthermore, where data is transmitted via TCP/IP packets, the header information is lost by the first recipient in the data center, and there is no additional contextual or routing information that controls the path that the data is to travel through various security microservices. As an example, header information containing a media access control (MAC) address identifying a physical interface may be lost as a data stream crosses a network address translation (NAT) boundary.

Additionally, cloud architectures increasingly rely on distributed processing with processes on different physical servers transmitting information among programs. When transmitting processed data, routing information available in the source data of one process may be lost as that processed data is sent to another process. As an example, a content scanning service operates subsequent to a TCP/IP reassembly service monitoring network traffic. The output of the TCP/IP reassembly service no longer contains packets (rather it contains the data stream transported by the packets) and thus may not provide some routing information, or information derived from that routing information, to subsequent processing elements.

According to embodiments disclosed herein are embodiments of systems, methods, and apparatuses that utilize channel data encapsulation to provide a uniform means of communication among distributed microservices of a security service. Channel data encapsulation allows for many advantageous uses including in a non-limited manner: reduction of network routing load, dynamic scaling of microservices, and removal of constraints regarding the deployment of microservices that are components of a security service.

According to embodiments disclosed herein, network packets are assigned to a data channels, and are encapsulated in a channel data encapsulation packet that comprises at least one or more network packets, an encapsulation context, and an encapsulation header. A channel data encapsulation packet can carry more than one network packet. The channel data encapsulation packet includes information to identify data channels and their properties, and to deal with conflicting server addresses. The channel data encapsulation packet includes routing information and security context that determine to which security microservice(s) the data of the channel data encapsulation packet should be routed. In some embodiments, additional information, such as loading information and a timestamp, are included in the channel data encapsulation packet. The channel data encapsulation packet includes information to allow the datacenter security microservice(s) to route the data to the next appropriate security microservice in the hierarchy of security microservices. As an example, a TCP/IP microservice will route channel data encapsulation packet to an encryption/decryption microservice, or a DPI microservice, based at least in part on the encapsulation context.

The encapsulated channel data consists of packets or information derived from processing the packets. In some embodiments, the same encapsulation is used to transport packets to a packet analysis service and subsequently transport the reassembled data stream to a further security service. By encapsulating the reassembled data with an encapsulation context, information derived from the original source packets may be utilized by services operating on post-processed data without the use of source packets available to those services.

Encapsulating channel data is accomplished through the use of an encapsulation header consisting of routing header information required to transport the encapsulated data. This header may consist of an Ethernet, IP, or other header sufficient to identify a receiver of the encapsulated channel data. Within a datacenter, encapsulating host networks (IP based) with management hypervisor networks (also IP based) is common. As an example, software-defined networking may use IP-over-IP encapsulation to provide connectivity among virtual machines.

The inclusion of an encapsulation context that may be maintained across microservices that process received data and transmit processed data using the same channel data encapsulation scheme allows policies associated with the context to be maintained across the hierarchy of security services without maintaining a policy state at each hierarchy level. The encapsulation context may also be used to define security actions. A microservice may determine a security operation to be performed based on the encapsulation context. As an example, a DPI microservice may determine what degree of scanning is required based on the encapsulation context even though the DPI microservice has no knowledge of the original packets.

Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data. By tagging the encapsulated channel rather than the contents contained therein, efficiency in both routing and processing is achieved, while maintaining real-time information required for load balancing among the microservices.

FIG. 1 is a block diagram illustrating an embodiment of components of a scalable microservice architecture using microservices. Network security system microservices are stored in memory (e.g., volatile memory such as Random Access Memory (RAM) and/or non-volatile memory such as disk) and executed by one or more hardware processors or processor cores. Network security system microservices, consisting of computer executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A network interface 128 (e.g., fabric or interconnect that is wired or wireless) provides a means for communicating with a data center. Network security system may inspect traffic, detect threats, and otherwise protects a data center, as further described below, using microservices.

Embodiments of a network security system providing the above capabilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes a hardware processor 102 (as detailed above), memory 104, and network interface 128. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize network interface 128 to explore the datacenter to discover what network segments exist, the security requirements of various network segments, and what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, then offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122 (108-122), as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIGS. 2 and 3. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIGS. 2 and 3.

Network security system receives traffic via network interface 128 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIGS. 2 and 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-to-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

In an embodiment, microservices 108-122 are implemented using computer-executable instructions loaded from the Internet, via network interface 128. For instance, in an embodiment, the microservices are implemented with computer-executable instructions downloaded from a web site or online store site. In some embodiments, microservices 108-122 are implemented with computer-executable instructions loaded into memory 104. In various embodiments, the microservices are implemented with computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

Environments for hosting virtual chassis 106

| Environment | Description |
|---|---|
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |

TABLE 1-continued

Environments for hosting virtual chassis 106

| Environment | Description |
| --- | --- |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In some examples, network security system scales out using available resources to accommodate higher traffic or load. In an exemplary embodiment, hardware processor 102 and memory 104 is scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

A common property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of the operating system on which they were spawned.

Figure 2:
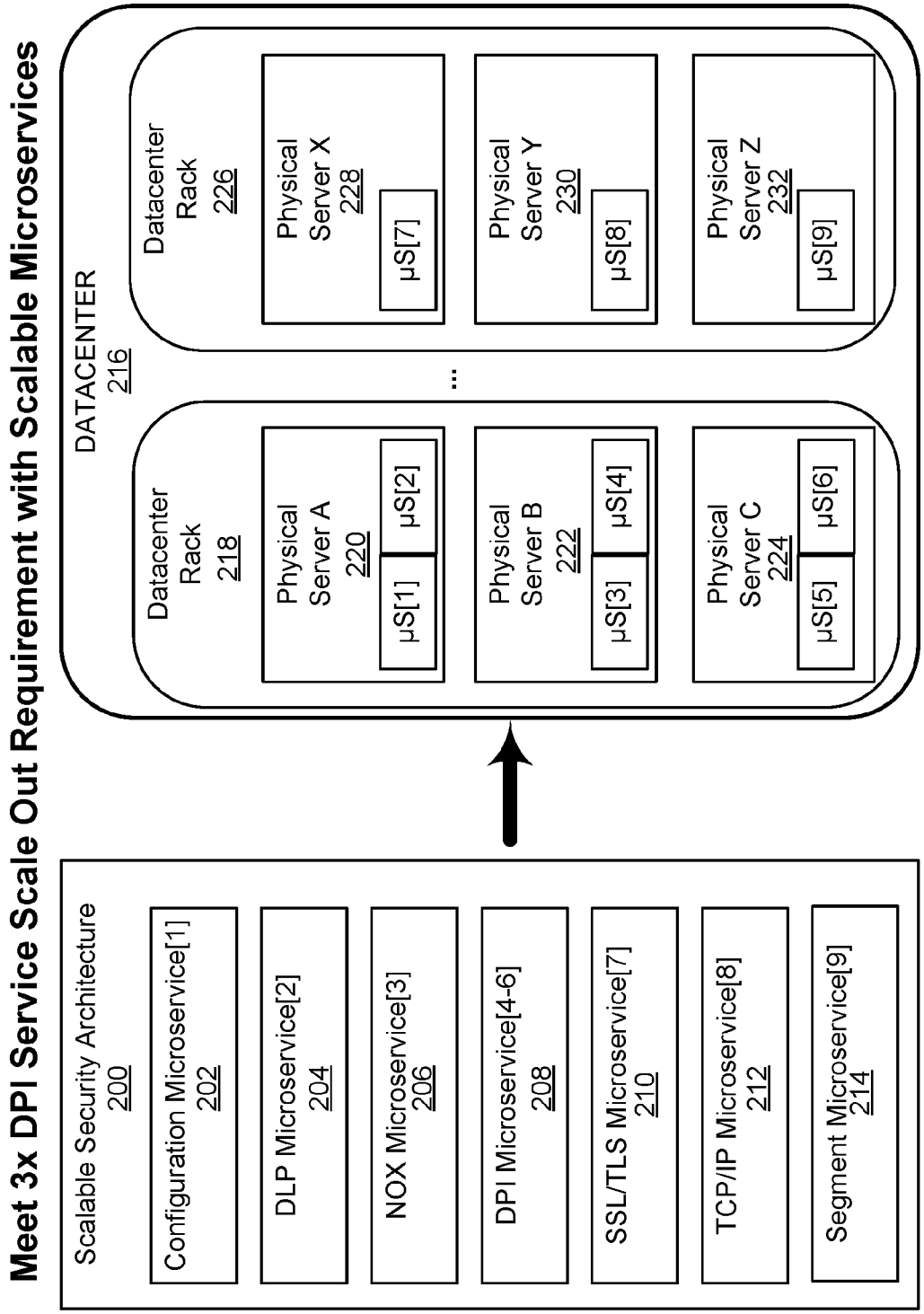
FIG. 2 illustrates meeting an embodiment of a scalable security architecture implementing a three-time scale out requirement using security microservices, according to an embodiment.

FIG. 2 illustrates meeting a three-time scale out requirement, according to an embodiment, using microservices. In this example, only a single microservice (DPI) requires additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy is scaled and configured independently to load balance the supply of processed data to the next hierarchy level. As shown, datacenter 216 includes datacenter rack 218, which includes physical server A 220, physical server B, 222, and physical server C 224, As shown, datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z, 220, 228, 230, and 232. A configuration microservice 202 creates a configuration backplane and a data plane deployed as a software component on each physical server that is to receive security services. This creating process takes the form of configuring routing rules, reserving network address space (such as a subnet) and configuring virtual environments to utilize portions of the reserved address space as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

Figure 3:
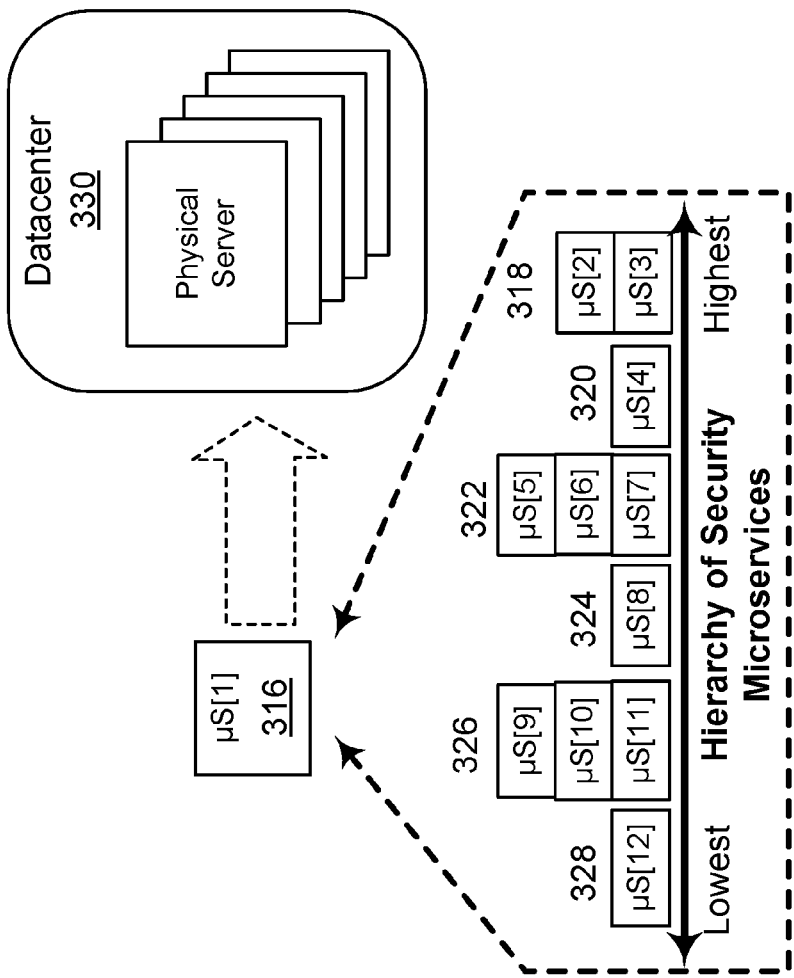
FIG. 3 illustrates meeting an arbitrary scale-out requirement by scaling out a microservice according to an embodiment.
Figure 3:
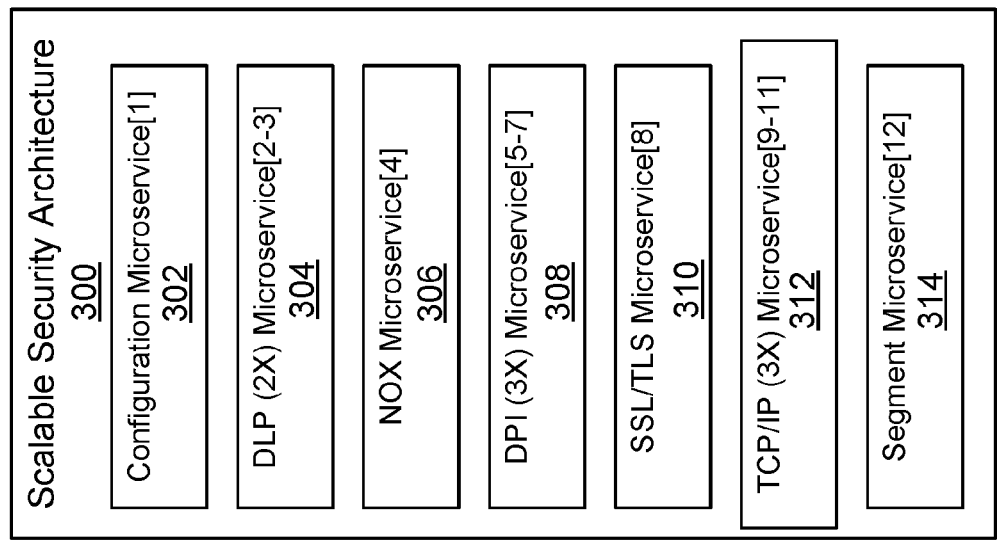

FIG. 3 illustrates meeting an arbitrary scale-out requirement according to an embodiment. As shown, scalable security architecture 300 includes configuration microservice 302, DLP (2×) microservice 304 (needing a 2-times scale-out), NOX microservice 306, DPI (3×) microservice 308 (needing a 3-times scale-out), SSL/TLS microservice 310, TCP/IP (3×) microservice 312 (needing a 3-times scale-out), and segment microservice 314. As shown, configuration microservice 316, provisions (318, 320, 322, 324, 326, and 328) the 11 microservices from a lowest hierarchy to a highest hierarchy, and configures them to communicate with each other via a backplane. The microservices are implemented by physical servers in datacenter 330.

Figure 4:
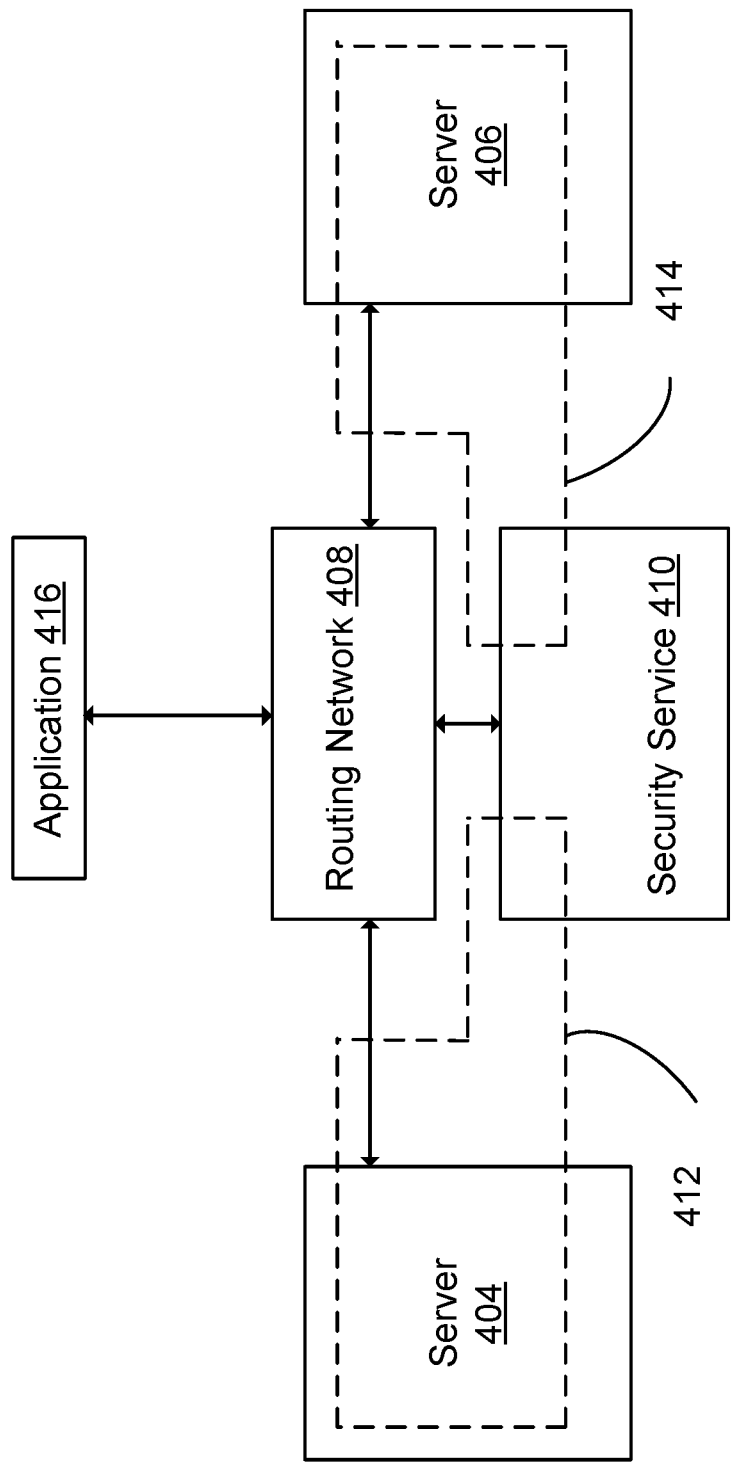
FIG. 4 is a block diagram illustrating a security service to monitor traffic between an Application and one or more servers through a routing network according to an embodiment.

FIG. 4 is a system level block diagram according to an embodiment. One or more security services 410 monitor traffic between an application 416 and one or more servers 404 and 406 through a routing network 408 according to an embodiment. The security service 410 is a group of microservices used to secure traffic from/to the application 416 and the servers 404 and 406. These microservices do not need to be confined to one physical server such as server 404 or server 406. For example, one or more microservices of the security service 410 may be executed on server 404 and other microservices of the security service 410 are executed on server 406. In some embodiments, the security service 410 is executed on a server that it is not protecting.

Routing network 408 provides connectivity among server 404, server 406, security service 410, and application 416, and may support encapsulation protocols employed by embodiments disclosed herein. In some embodiments, routing network 408 is partially configured responsive to hypervisor configuration of servers 404 and 406.

By virtue of routing information included in channel data encapsulation packets, as explained further below, data traveling between an application 416 and server 404 and/or server 406 is routed to the correct server, and is kept separate from data traveling between the application 416 and the other server. Accordingly, what is essentially a private network 412 is created between the server running security service 410 and server 404. Similarly, what is essentially a private network 414 is created between the server running security service 410 and server 406.

Figure 5:
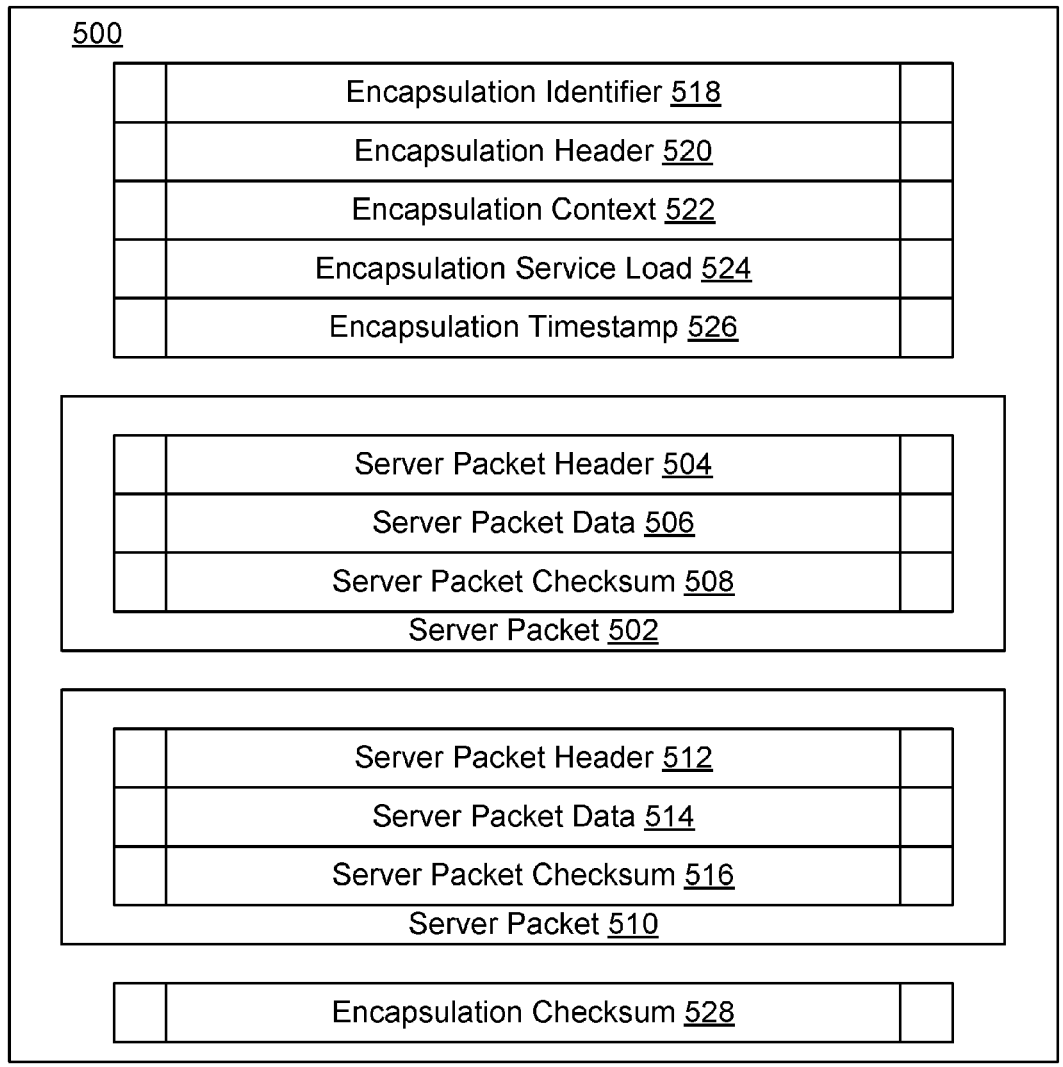
FIG. 5 illustrates a data packet encapsulation.

FIG. 5 illustrates a data channel encapsulation packet according to an embodiment. As illustrated, channel data encapsulation packet 500 encapsulates two server packets, server packet 502, which includes server packet header 504, server packet data 506, and server packet checksum 508, and server packet 510, which includes server packet header 512, server packet data 514, and server packet checksum 516. Channel data encapsulation packet 500 further includes encapsulation identifier 518, encapsulation header 520, encapsulation context 522, encapsulation service load 524, and encapsulation timestamp 526. The encapsulation service load is used to communicate the current loading of a security microservice when transmitting a response to a security microservice of a lower hierarchy level in such a way as to enable the receiving security microservice to select from a plurality of higher hierarchy microservice in a load balancing decision. The encapsulation timestamp provides (directly or indirectly) a latency transmitted as part of a response to a security microservice in the same manner as the service load. In some embodiments, both service load and latency are utilized in a load balancing decision. The channel data encapsulation packet 500 also includes encapsulation checksum 528. In some embodiments, the encapsulation header 520 and the encapsulation identifier 518 are used when calculating the encapsulation checksum 528. The encapsulation checksum provides an integrity check over the channel data encapsulation packet. In some embodiments, the checksum covers only the encapsulation header. Of course, while two server packets 502 and 510 are shown, this is merely for illustrative purposes and any number of server packets are supported.

When channel data encapsulation packet 500 encapsulates many server packets, for example between 5 and 100, this is effectively a transmission of a data channel, rather than individual data packets. As such, channel data encapsulation packet 500 promotes efficiency when high numbers of server packets are encapsulated. For example, a single routing decision can be made for a large number of server packets, rather than deciding their routing one-by-one. Moreover, a single load-balancing decision may be made to select a microservice to which to route the channel data. Furthermore, transmitting fewer, though larger data packets, reduces contention for a backplane.

In some embodiments, server packets 502 and 510 are in substantially similar TCP/IP format in which they were received by routing network 408. In alternate embodiments, server packets 502 and 510 are encapsulated with a new packet header and packet checksum.

Encapsulation identifier 518 includes additional information, such as the port number at which a server packet was received, the interface number of a security microservice at which a server packet was received, and additional information that together are used to identify a data channel between an application and a server. Therefore, even if two servers in a multi-tenant cloud computing datacenter share the same IP address, their data channels can be distinguished based on their encapsulation headers 520.

Encapsulation identifier 518 provides information about how encapsulated packets (e.g., server packets 502 and 510) are to be routed. For example, in one embodiment, encapsulation identifier 518 includes information indicating that the server packets 502 and 510 are to be routed according to a virtual local area network (VLAN) domain. In some embodiments, encapsulation identifier 518 is used to distinguish the data channel within a network environment.

Encapsulation header 520 includes miscellaneous information in addition to, or consistent with, the server packet headers 504 and 512. For example, encapsulation header 520 may include the number of server packets included in the channel data encapsulation packet. In some embodiments, server packet headers 504 and 512 are substantially the same as the headers associated with those data packets when they entered the security service. In an embodiment, server packet headers 504 and 512 are VLAN headers. In an embodiment, server packet headers 504 and 512 are TCP/IP headers.

Encapsulation context 522 consists of a policy that has application beyond routing policy. For example, encapsulation context 522, in an embodiment, describes not only how and where to route a packet, but also indicates what to do with the packet context as the server packets are processed.

Figure 6:
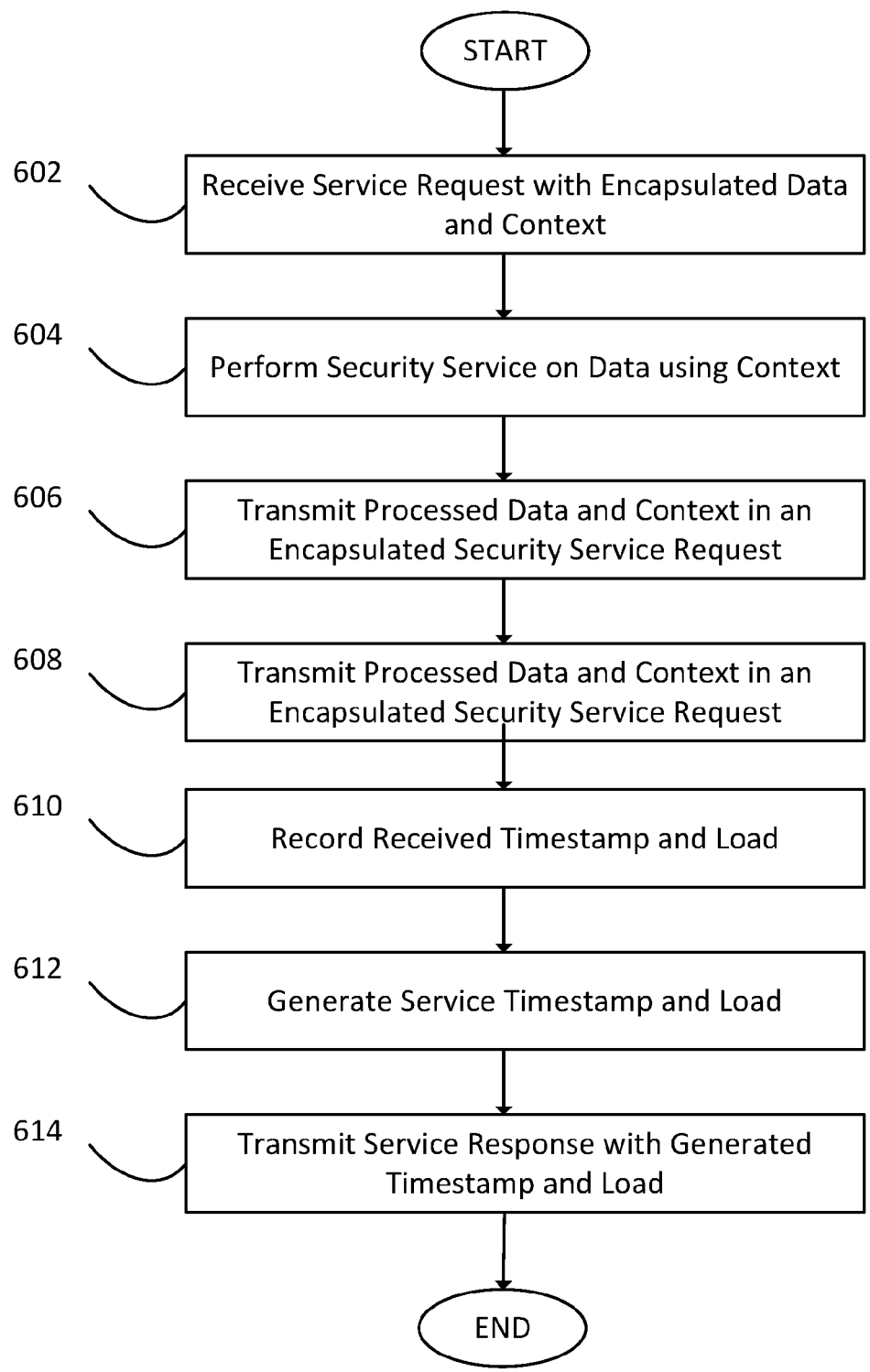
FIG. 6 is an embodiment of a process of using a channel data encapsulation method with client-server data channels.

FIG. 6 is an embodiment of a process of using a channel data encapsulation method with client-server data channels. A first security microservice receives an encapsulated request for security services 602 containing data and a context. The data may consist of one or more packets to be processed, reassembled packets as a stream of data, extracted objects or content from a reassembled stream of data or other data on which security services are to be performed. The context is then utilized to perform the security service 604 generating additional data in the form of the result of the service. For example, a TCP/IP service may generate data corresponding to a reassembled data stream. The generated data is transmitted along with the received context as 606 to a second microservice for further processing.

The first security microservice receives a response to its request for security service processing 606 from the second security microservice in the encapsulated data 608 containing a response, a context, a timestamp and a load. In some embodiments, the response contains additional data generated as part of the requested service processing. The context in 608 may be the same context as that received in 602 or may be modified as a result of the processing by the second security microservices. The timestamp represents the duration of the processing between 606 and 608. In some embodiments, a new timestamp is calculated by the first security microservice based on the difference of the received timestamp from the current time (elapsed time). In some embodiments, the timestamp is a duration of time as calculated by the second security microservice that generated the timestamp value. The received load value represents the loading of the second security microservice during the time the request for security services was processed. The timestamp and load value are recorded in 610. In some embodiments, the timestamp and load value are used in load balancing decisions for future security service requests by the first security microservice.

Having received a response to the request for service from the second security microservice, the first security microservice generated its own timestamp and load 612 and transmits a response to the original request for security services 602 including the generated timestamp and load. This response 614 also takes the encapsulated form described in FIG. 5 and also includes the context as received from, the second security microservice. In some embodiments, the first security microservice modifies the context transmitted in 614 based on the processing within the first security microservice, the response from the second security microservice or a combination of the two.

Figure 7:
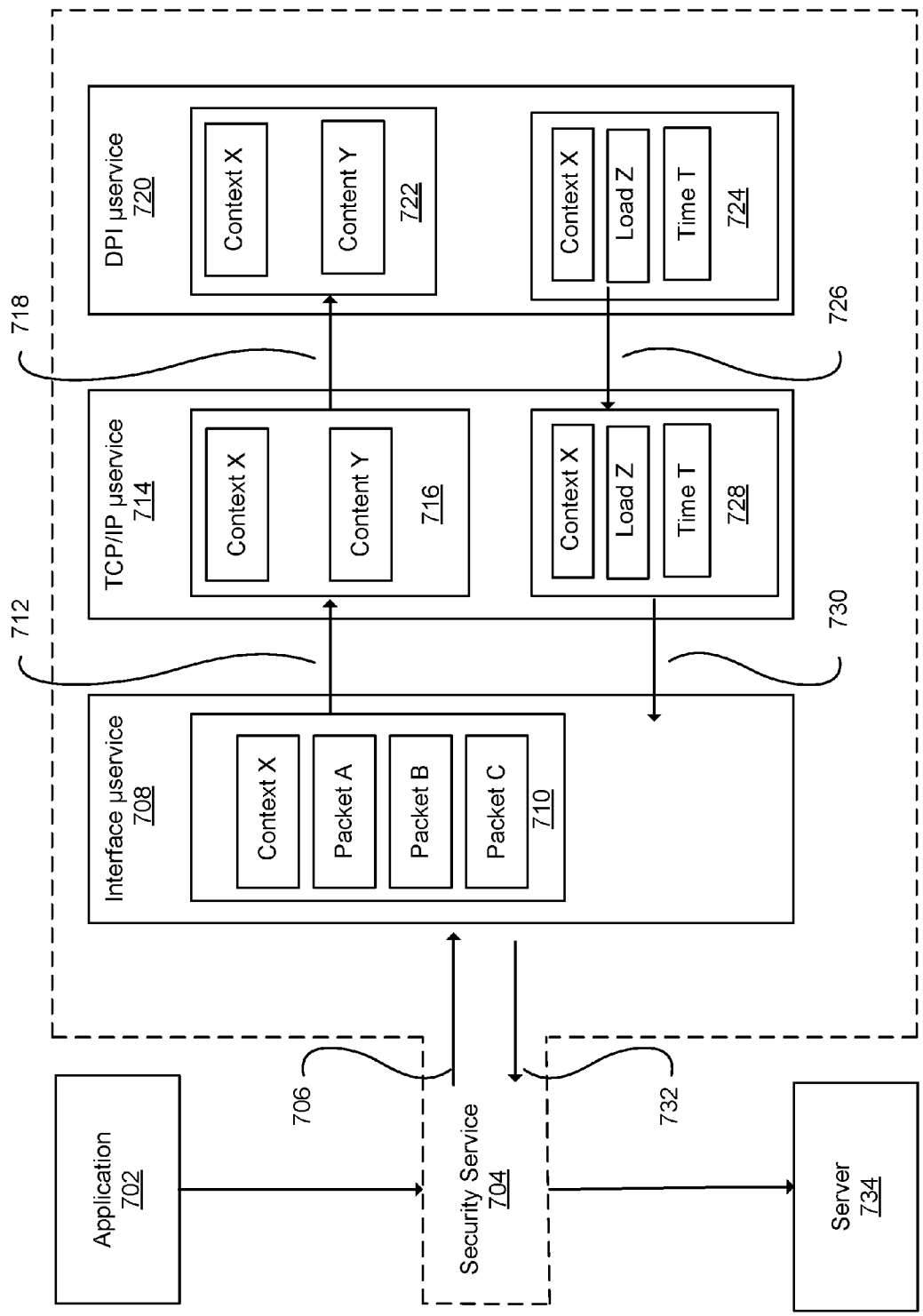
FIG. 7 is a block flow diagram illustrating application data traversing to a server after passing through a hierarchy of a security microservices according to an embodiment.

FIG. 7 is a block flow diagram illustrating application data traversing to a server after passing through a hierarchy of a security microservices according to an embodiment. As illustrated, the flow begins with security service 704 receiving a network data packet from application 702. Security service 704 forwards 706 the packet to interface microservice 708, which generates a channel data encapsulation packet 710, which encapsulates three packets A, B, and C, and context X. As shown, channel data encapsulation packet 710 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing required for handling packets A, B and C. As an example, context X may be generated by performing a hash, longest prefix match or lookup of header fields such as IP addresses, TCP Ports, Interface Names (or MAC Addresses) or other packet properties. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

Interface microservice 708 transmits 712 the channel data encapsulation packet 710 to TCP/IP microservice 714. As shown the channel data encapsulation packet 716 includes context X and content Y, which corresponds to packets A, B, and C of channel data encapsulation packet 710. After conducting security processing of the channel data encapsulation packet 716, TCP/IP microservice 714 transmits 718 it to DPI microservice 720. As shown the channel data encapsulation packet 722 includes context X and content Y, which corresponds to packets A, B, and C of channel data encapsulation packet 710. After conducting security processing of the channel data encapsulation packet 722, DPI microservice 720 generates channel data encapsulation packet, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 720 transmits, via path 726, channel data encapsulation packet 724 to TCP/IP microservice 714, which uses the DPI load and DPI timestamp information to inform future load-balancing decisions. As shown, TCP/IP microservice 714 generates channel data encapsulation packet 728, which includes context X, TCPI/IP load Z, and TCP/IP Timestamp T. As shown, TCP/IP microservice 714 transmits, via path 730, channel data encapsulation packet 728 to interface microservice 708, which uses the TCP/IP load and TCP/IP timestamp information to inform future load-balancing decisions. The flow is completed when interface microservice 708 transmits, via path 732, packets to security service 704, which transmits them to server 734.

The benefits of the security service 704 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 708 to all subsequent microservices that no longer have access to the original packets. By providing load and timestamp data in the channel data encapsulation packets 724 and 728, which are returned via paths 726 and 730, the microservices receive and can maintain real-time loading and processing latency information utilized to make load balancing decisions.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A method comprising:
receiving, by a first security microservice, a first channel data encapsulation packet encapsulating a first encapsulation context and a first encapsulated data;
performing a security service on the first encapsulated data using the first encapsulation context, wherein the security service is one of a plurality of microservices used to secure traffic passing between applications and servers through a routing network;
receiving, by the first security microservice, a response from the second security microservice comprising a second security microservice context, a second timestamp, and a second load;
generating, by the first security microservice, a first timestamp and a first load, wherein the timestamps represent the duration of processing performed by the first and second microservices and the first and second loads represent the loading of the first and second microservices processing the encapsulated channel data, the loading being represented in either relative or absolute terms; and
transmitting, by the first security microservice, a response to the first channel data encapsulation packet, wherein the response includes the first timestamp and first load generated by the first security microservice, wherein the timestamp and load values are recorded to be used in load balancing decisions for future security service requests among microservices; and
wherein the first and second security microservices are implemented with computer-readable instructions stored in memory on a network security server, the memory coupled to one or more hardware processors executing the first and second security microservices.

2. The method of claim 1, wherein the first channel data encapsulation packet to contain an encapsulation identifier to distinguish a data channel associated with the first data channel encapsulation packet within a network environment.

3. The method of claim 2, wherein the first channel data encapsulation packet to contain an encapsulation header.

4. The method of claim 3, wherein the encapsulation header to define a location within the first channel data encapsulation packet of the first encapsulation context and a first encapsulation service load.

5. The method of claim 4, wherein the encapsulation header further to define a timestamp, and wherein the first security microservice to record the second security microservice timestamp and the second security microservice load.

6. The method of claim 3, wherein the first channel data encapsulation packet further to include an encapsulation checksum.

7. The method of claim 6, wherein calculating the encapsulation checksum to use the encapsulation identifier and the encapsulation header.

8. A system comprising:
a memory; and
a processor to execute instructions to implement a first security microservice, the first security microservice to:
receive a first channel data encapsulation packet encapsulating a first encapsulation context and a first encapsulated data;
perform a security service on the first encapsulated data using the first encapsulation context, wherein the security service is one of a plurality of microservices used to secure traffic passing between applications and servers through a routing network;
transmit a second channel data encapsulation packet to a second security microservice, wherein the second channel data encapsulation packet comprises a request for security services;
receive a response from the second security microservice comprising a second security microservice context, a second timestamp, and a second load;
generate a first timestamp and a first load, wherein the timestamps represent the duration of processing performed by the first and second microservices and the loads represent the loading of the first and second microservices processing the encapsulated channel data, the loading being represented in either relative or absolute terms; and
transmit a response to the first channel data encapsulation packet, the response including the first timestamp and first load, wherein the timestamp and load values are recorded to be used in load balancing decisions for future security service requests among microservices, and
wherein the first and second security microservices are implemented with computer-readable instructions stored in memory on a network security server, the memory coupled to one or more hardware processors executing the first and second security microservices.

9. The system of claim 8,
wherein the first channel data encapsulation packet to contain an encapsulation identifier to distinguish a data channel associated with the first data channel encapsulation packet within a network environment.

10. The system of claim 9,
wherein the first channel data encapsulation packet to contain an encapsulation header.

11. The system of claim 10, wherein the encapsulation header to define a location within the first channel data encapsulation packet of the first encapsulation context and a first encapsulation service load.

12. The system of claim 11, wherein the encapsulation header further to define a timestamp.

13. The system of claim 10, wherein the first channel data encapsulation packet further to include an encapsulation checksum.

14. The system of claim 13, wherein the first security microservice to use the encapsulation identifier and the encapsulation header when calculating the encapsulation checksum.

15. The system of claim 8, wherein the first security microservice to record the second security microservice timestamp and the second security microservice load.

16. A non-transitory computer-readable medium containing computer-executable instructions that, when executed by a processor, cause the processor to perform a method comprising:

receiving, by a first security microservice, a first channel data encapsulation packet encapsulating a first encapsulation context and a first encapsulated data;

performing a security service on the first encapsulated data using the first encapsulation context, wherein the security service is one of a plurality of microservices used to secure traffic passing between applications and servers through a routing network;

transmitting, by the first security microservice, a second channel data encapsulation packet to a second security microservice, wherein the second channel data encapsulation packet comprises a request for security services;

receiving by the first security microservice a response from the second security microservice comprising a second security microservice context, a second timestamp, and a second load;

generating, by the first security microservice, a first timestamp and a first load, wherein the timestamps represent the duration of processing performed by the first and second microservices and the first and second loads represent the loading of the first and second microservices processing the encapsulated channel data, the loading being represented in either relative or absolute terms; and transmitting, by the first security microservice, a response to the first channel data encapsulation packet, wherein the response includes the first timestamp and first load generated by the first security microservice, wherein the timestamp and load values are recorded to be used in load balancing decisions for future security service requests among microservices; and wherein the first and second security microservices are implemented with computer-readable instructions stored in memory on a network security server, the memory coupled to one or more hardware processors executing the first and second security microservices.

17. The non-transitory computer-readable medium of claim 16, wherein the first channel data encapsulation packet to contain an encapsulation identifier to distinguish a data channel associated with the first data channel encapsulation packet within a network environment.

18. The non-transitory computer-readable medium of claim 16, wherein the first channel data encapsulation packet to contain an encapsulation header.

19. The non-transitory computer-readable medium of claim 18, wherein the encapsulation header to define a location within the first channel data encapsulation packet of the first encapsulation context and the first encapsulation data.

20. The non-transitory computer-readable medium of claim 18, wherein the encapsulation header further to define a timestamp.

* * * * *